US012537311B2

(12) United States Patent
Kim et al.

(10) Patent No.: US 12,537,311 B2
(45) Date of Patent: Jan. 27, 2026

(54) ANTENNA PACKAGE AND DISPLAY DEVICE INCLUDING THE SAME

(71) Applicants: DONGWOO FINE-CHEM CO., LTD., Jeollabuk-do (KR); KREEMO INC., Seoul (KR)

(72) Inventors: Na Yeon Kim, Seoul (KR); Young Ju Kim, Gyeonggi-do (KR); Yoon Ho Huh, Seoul (KR); In Seok Jang, Gyeonggi-do (KR); Beak Jun Seong, Gyeonggi-do (KR); Jun Ho Park, Incheon (KR); In Kyung Hong, Seoul (KR); John Joonho Park, Gyeonggi-do (KR)

(73) Assignees: DONGWOO FINE-CHEM CO., LTD., Jeollabuk-Do (KR); KREEMO INC., Seoul (KR)

( * ) Notice: Subject to any disclaimer, the term of this patent is extended or adjusted under 35 U.S.C. 154(b) by 599 days.

(21) Appl. No.: 17/965,932

(22) Filed: Oct. 14, 2022

(65) Prior Publication Data

US 2023/0121298 A1 Apr. 20, 2023

(30) Foreign Application Priority Data

Oct. 14, 2021 (KR) ........................ 10-2021-0136909

(51) Int. Cl.

*H01Q 1/38* (2006.01)
*H01Q 5/385* (2015.01)
*H01Q 5/55* (2015.01)
*H01Q 19/00* (2006.01)

(52) U.S. Cl.

CPC ............. *H01Q 19/005* (2013.01); *H01Q 1/38* (2013.01); *H01Q 5/385* (2015.01); *H01Q 5/55* (2015.01)

(58) Field of Classification Search

CPC ........ H01Q 19/005; H01Q 1/38; H01Q 5/385; H01Q 5/55; H01Q 21/06; H01Q 1/243; H01Q 1/48; H01Q 1/46

See application file for complete search history.

(56) References Cited

U.S. PATENT DOCUMENTS

2008/0218418 A1* 9/2008 Gillette .................. H01Q 9/045
343/700 MS
2020/0350695 A1* 11/2020 Kim ....................... H01Q 21/08

(Continued)

FOREIGN PATENT DOCUMENTS

CN 112310609 A * 2/2021 ........... H01Q 1/2208
KR 20160027446 A * 3/2016 ............... H01Q 1/46
KR 101744886 B1 * 6/2017 ........... H01Q 9/0407

(Continued)

OTHER PUBLICATIONS

Office action issued on Nov. 19, 2025 from Korean Patent Office in a counterpart Korean Patent Application No. 10-2021-0136909 (English translation is also submitted herewith.).

*Primary Examiner* — Dimary S Lopez Cruz
*Assistant Examiner* — Bamidele A Immanuel
(74) *Attorney, Agent, or Firm* — The PL Law Group, PLLC

(57) ABSTRACT

An antenna package includes an antenna device and a circuit board bonded to the antenna device. The circuit board includes a core layer, a feeding line formed on the core layer and bonded to the antenna device, and a CPW ground formed on the core layer to be physically separated from the feeding line and the antenna device.

20 Claims, 13 Drawing Sheets

(56) References Cited

U.S. PATENT DOCUMENTS

| | | | | |
|---|---|---|---|---|
| 2022/0276682 | A1* | 9/2022 | Yu | H01Q 21/08 |
| 2023/0231322 | A1* | 7/2023 | Jung | H01Q 1/38<br>343/702 |

FOREIGN PATENT DOCUMENTS

| | | | |
|---|---|---|---|
| KR | 10-2017-0094740 | A | 8/2017 |
| KR | 10-1962821 | B1 | 7/2019 |
| KR | 10-2019952 | B1 | 9/2019 |
| WO | WO 2021/147945 | A1 | 7/2021 |

* cited by examiner

ANTENNA PACKAGE AND DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2021-0136909 filed on Oct. 14, 2021, in the Korean Intellectual Property Office (KIPO), the entire disclosures of which are incorporated herein by reference for all purposes.

BACKGROUND

1. Field

The present invention relates to an antenna package and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

As mobile communication technologies have been rapidly developed, an antenna capable of operating a high frequency or ultra-high frequency communication is needed in the image display device.

For example, as various functional elements are employed in the image display device, a wide range of a frequency coverage capable of being transmitted and received by an antenna may be needed. Further, if the antenna has a plurality of polarization directions, radiation efficiency may be increased and an antenna coverage may be further increased.

However, as a driving frequency of the antenna increases, signal loss may also be increased. Further, a length of a transmission path increases, an antenna gain may be decreased. If the radiation coverage of the antenna is expanded, a radiation density or the antenna gain may be reduced to degrade radiation efficiency/reliability.

Moreover, design of an antenna that has multi-polarization and broadband properties and provides a high gain may not be easily implemented in a limited space of the image display device.

SUMMARY

According to an aspect of the present invention, there is provided an antenna package having improved radiation property and spatial efficiency.

According to an aspect of the present invention, there is provided an image display device including an antenna package with improved radiation property and spatial efficiency.

(1) An antenna package, including: an antenna device and a circuit board bonded to the antenna device, the circuit board including: a core layer; a feeding line formed on the core layer and bonded to the antenna device; and a CPW (Co-planar waveguide) ground formed on the core layer to be physically separated from the feeding line and the antenna device.

(2) The antenna package of the above (1), wherein a spacing distance between the CPW ground and the feeding line is constant.

(3) The antenna package of the above (1), wherein at least a portion of the CPW ground is farther away from the feeding line as the CPW ground becomes closer to the antenna device.

(4) The antenna package of the above (3), wherein the CPW includes: a first region having a constant spacing distance from the feeding line; and a second region that is farther away from the feeding line as the CPW ground becomes closer to the antenna device.

(5) The antenna package of the above (4), wherein the second region has a stepped shape or a chamfer shape.

(6) The antenna package of the above (1), wherein the antenna device includes: a dielectric layer; a radiator disposed on a top upper surface of the dielectric layer; a transmission line including a first transmission line and a second transmission line that extend in different directions on the top surface of the dielectric layer to be connected to the radiator; an upper parasitic element disposed to be adjacent to an upper portion of the radiator on the top surface of the dielectric layer; and a lower parasitic element disposed to be adjacent to the transmission line and a lower portion of the radiator on the top surface of the dielectric layer.

(7) The antenna package of the above (6), wherein the feeding line includes: a first feeding line bonded to the first transmission line; and a second feeding line bonded to the second transmission line, wherein the CPW ground includes: a central ground disposed between the first feeding line and the second feeding line; a first side ground facing the central ground with the first feeding line interposed therebetween; and a second side ground facing the central ground with the second feeding line interposed therebetween.

(8) The antenna package of the above (6), wherein the CPW ground is disposed around the lower parasitic element.

(9) The antenna package of the above (8), wherein a spacing distance between the CPW ground and the lower parasitic element in a plan view is 20 μm or more.

(10) The antenna package of the above (6), wherein the radiator includes convex portions and concave portions, and the first transmission line and the second transmission line are connected to different concave portions of the concave portions.

(11) The antenna package of the above (6), wherein the first transmission line comprises: a first feeding portion; and a first bent portion extending from the first feeding portion to be connected to the radiator; wherein the second transmission line comprises: a second feeding portion; and a second bent portion extending from the second feeding portion to be connected to the radiator.

(12) The antenna package of the above (6), wherein the upper parasitic element includes a first upper parasitic element and a second upper parasitic element separated from each other.

(13) The antenna package of the above (12), wherein the radiator includes convex portions and concave portions, and the first upper parasitic element and the second upper parasitic element are adjacent to different concave portions of the concave portions.

(14) The antenna package of the above (13), wherein the first upper parasitic element and the second upper parasitic element face each other with a convex portion located at an upper portion of the radiator among the convex portions interposed therebetween.

(15) The antenna package of the above (6), wherein the lower parasitic element includes: a central parasitic element disposed between the first transmission line and the second transmission line; a first side parasitic element facing the central parasitic element with the first transmission line interposed therebetween; and a second side parasitic element facing the central parasitic element with a second transmission line interposed therebetween.

(16) The antenna package of the above (15), wherein the first side parasitic element includes: a first parasitic body facing the central parasitic element with the first transmission line interposed therebetween; a first parasitic extension protruding from the first parasitic body; and a first parasitic bent portion extending from the first parasitic extension toward the radiator, wherein the second side parasitic element includes: a second parasitic body facing the central parasitic element with the second transmission line interposed therebetween; a second parasitic extension protruding from the second parasitic body; and a second parasitic bent portion extending from the second parasitic extension toward the radiator.

(17) The antenna package of the above (16), wherein the radiator has a mesh structure, and the central parasitic element, the first parasitic body and the second parasitic body have a solid structure.

(18) The antenna package of the above (17), wherein a portion of the first transmission line between the central parasitic element and the first parasitic body has a solid structure, and a remaining portion of the first transmission line has a mesh structure, and a portion of the second transmission line between the central parasitic element and the second parasitic body has a solid structure, and a remaining portion of the second transmission line has a mesh structure.

(19) The antenna package of the above (16), wherein the radiator has a mesh structure, and each of the central parasitic element, the first parasitic body and the second parasitic body includes a mesh portion and a solid portion.

(20) The antenna package of the above (6), wherein the radiator has a four-leaf clover shape or a cross shape.

(21) An image display device including the antenna package of the above-described embodiments.

According to embodiments of the present invention, an antenna device may include a radiator including a plurality of convex portions and concave portions, and may include a plurality of transmission lines connected to the radiator in different directions. A plurality of polarization directions and a coverage of a plurality of frequencies may be substantially provided by the combination of the radiator and the transmission line.

In exemplary embodiments, a circuit board having a CPW or a GCPW structure may be connected to the antenna device to improve an antenna gain and a directivity by an improvement of a degree of isolation.

In exemplary embodiments, feeding signals of different phases may be applied to the antenna device to implement a triple-band antenna.

In exemplary embodiments, a plurality of parasitic elements may be arranged around the radiator and the transmission line. A formation of the plurality of resonance frequencies may be promoted by the parasitic elements, so that a substantially effective triple-band antenna may be implemented.

DETAILED DESCRIPTION OF THE EMBODIMENTS

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

An antenna device as described herein may be, e.g., a microstrip patch antenna fabricated in the form of a transparent film. The antenna device may be applied to communication devices for a mobile communication of a high or ultrahigh frequency band corresponding to a mobile communication of, e.g., 3G, 4G, 5G or more.

According to exemplary embodiments of the present invention, an image display device including the antenna structure is also provided. The image display device may be implemented in the form of various electronic devices such as a smart phone, a tablet, a laptop computer, a wearable device, a digital camera, etc.

An application of the antenna device is not limited to the image display device, and the antenna device may be applied to various objects or structures such as a vehicle, a home electronic appliance, an architecture, etc.

In the accompanying drawings, two directions parallel to a top surface of a dielectric layer and perpendicular to each other are defined as an x-direction and a y-direction. A direction vertical to the top surface of the dielectric layer is defined as a z-direction. For example, the y-direction may correspond to a length direction of the antenna device, the x-direction may correspond to a width direction of the antenna structure, and the z-direction may correspond to a thickness direction of the antenna structure.

Figure 1:
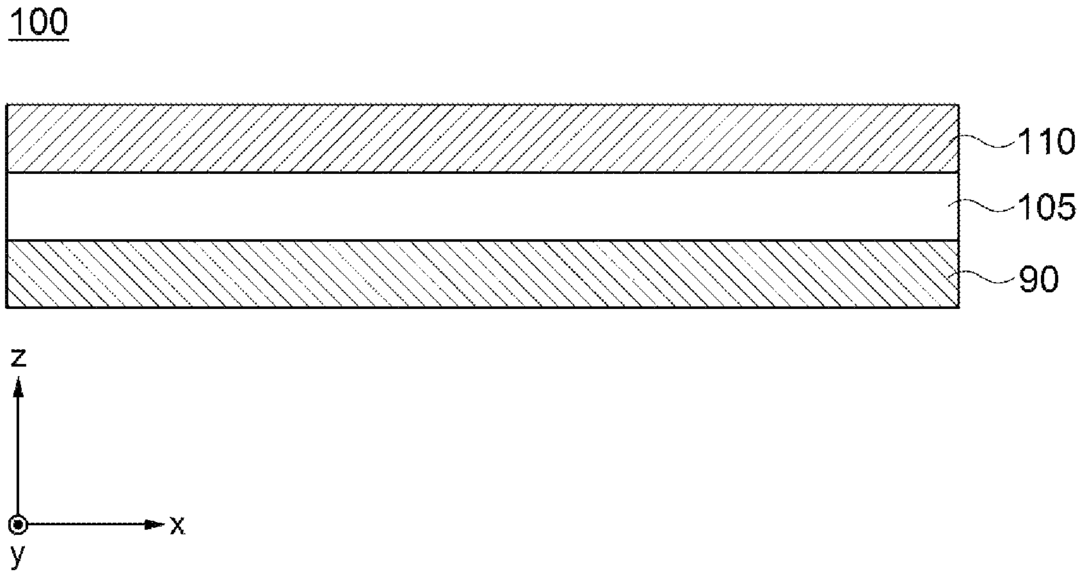
FIG. 1 is a schematic cross-sectional view illustrating an antenna device in accordance with exemplary embodiments.

FIG. 1 is a schematic cross-sectional view illustrating an antenna device in accordance with exemplary embodiments.

Referring to FIG. 1, an antenna device 100 according to exemplary embodiments may include a dielectric layer 105 and an antenna conductive layer 110.

The dielectric layer 105 may include an insulating material having a predetermined dielectric constant. In exemplary embodiments, the dielectric layer 105 may include an inorganic insulating material such as glass, silicon oxide, silicon nitride, or a metal oxide, or an organic insulating material such as an epoxy resin, an acrylic resin or an imide-based resin. The dielectric layer 105 may serve as a film substrate of the antenna device 100 on which the antenna conductive layer 110 is formed.

The dielectric layer 105 may include, e.g., a transparent resin material. For example, the dielectric layer 105 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

The dielectric layer 105 may include an adhesive material such as an optically clear adhesive (OCA), an optically clear resin (OCR), or the like.

In an embodiment, the dielectric layer 105 may be provided as a substantially single layer. In an embodiment, the dielectric layer 105 may include a multi-layered structure of at least two layers.

Capacitance or inductance may be formed in the dielectric layer 105, so that a frequency band at which the antenna device 100 may be driven or operated may be adjusted. In some embodiments, a dielectric constant of the dielectric layer 105 may be adjusted in a range from about 1.5 to about 12, preferably from 2 to 12. If the dielectric constant exceeds about 12, a driving frequency may be excessively decreased, and driving in a desired high frequency or ultrahigh frequency band may not be implemented.

In exemplary embodiments, an insulating layer (e.g., an encapsulation layer of a display panel, a passivation layer, etc.) at an inside of an image display device to which the antenna device 100 is applied may serve as the dielectric layer 105.

The antenna conductive layer 110 may be disposed on a top surface of the dielectric layer 105.

The antenna conductive layer 110 may include a low resistance metal, e.g., silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in a combination of at least two therefrom.

For example, the antenna conductive layer 110 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna conductive layer 110 may include a transparent conductive oxide such as indium tin oxide (ITO), indium zinc oxide (IZO), indium zinc tin oxide (ITZO), zinc oxide (ZnOx), etc.

In some embodiments, the antenna conductive layer 110 may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In an embodiment, the antenna conductive layer 110 may include a metamaterial.

In some embodiments, the antenna conductive layer 110 may include a blackened portion, so that a reflectance at a surface of the antenna conductive layer 110 may be decreased to suppress a visual pattern recognition due to a light reflectance.

In an embodiment, a surface of the metal layer included in the antenna conductive layer 110 may be converted into a metal oxide or a metal sulfide to form a blackened layer. In an embodiment, a blackened layer such as a black material coating layer or a plating layer may be formed on the antenna conductive layer 110 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In exemplary embodiments, the antenna device 100 may further include a ground layer 90. A vertical radiation property may be implemented by the inclusion of the ground layer 90.

The ground layer 90 may be disposed on a bottom surface of the dielectric layer 105. The ground layer 90 may overlap the antenna conductive layer 110 with the dielectric layer 105 interposed therebetween. For example, a radiator 120 (see FIG. 2) may be superimposed over the ground layer 90.

In an embodiment, a conductive member of the image display device or a display panel to which the antenna structure 100 is applied may serve as the ground layer 90. For example, the conductive member may include various electrodes or wirings such as, e.g., a gate electrode, a source/drain electrode, a pixel electrode, a common electrode, a scan line, a data line, etc., included in a thin film transistor (TFT) array panel.

In some embodiments, a metallic member disposed at a rear portion of the image display device such as a SUS plate, a sensor member (e.g., a digitizer), a heat dissipation sheet, etc., may serve as the ground layer 90.

Figure 2:
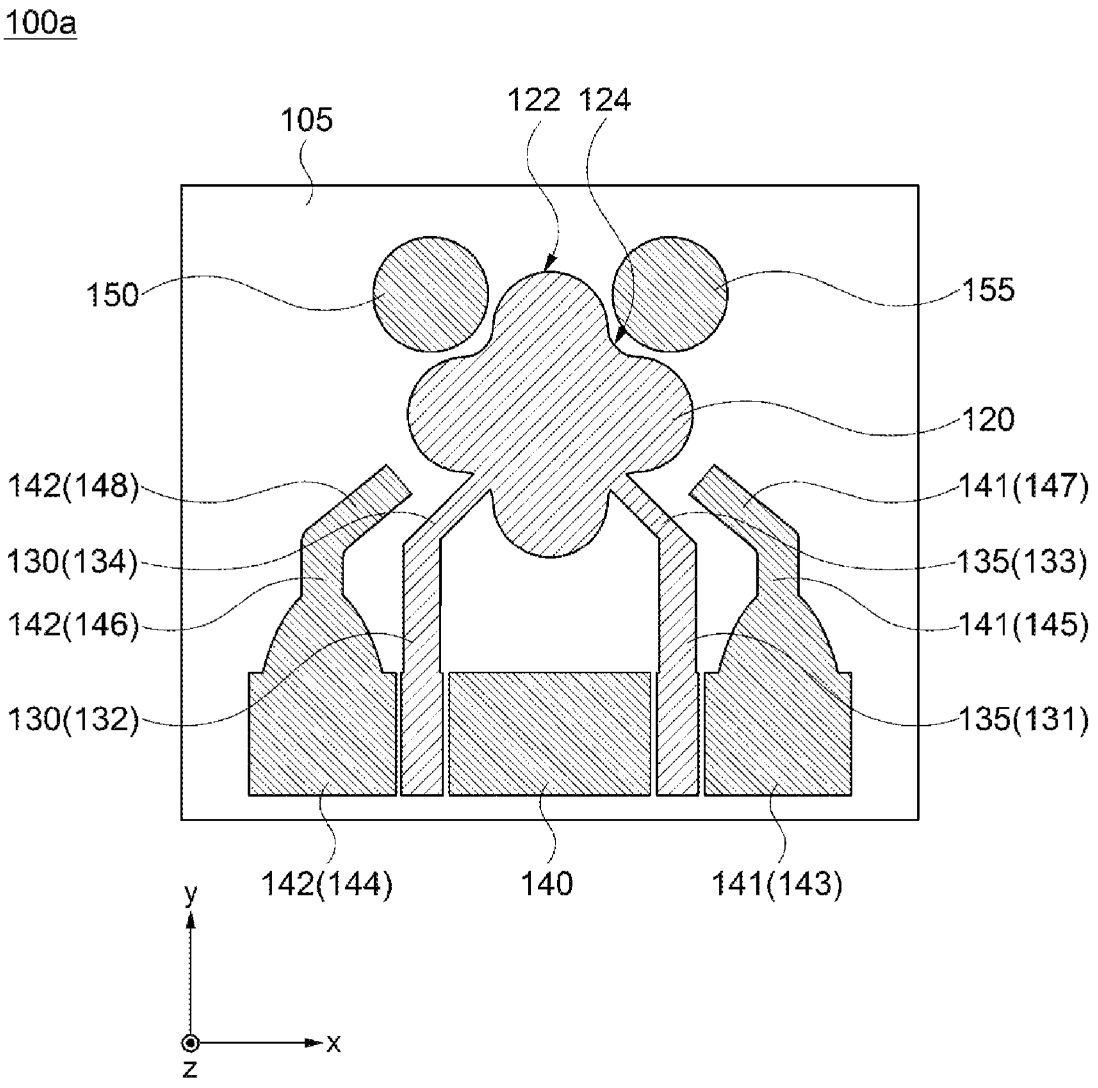
FIG. 2 is a schematic plan view illustrating an antenna device in accordance with exemplary embodiments.

FIG. 2 is a schematic plan view illustrating an antenna structure in accordance with exemplary embodiments.

Referring to FIG. 2, the antenna device **100*a* may include the antenna electrode layer 110 disposed on the dielectric layer 105 as described with reference to FIG. 1. The antenna conductive layer 110 may include a radiator 120, a transmission line 130 and 135, and a parasitic element 140, 141, 142, 150 and 155**.

In exemplary embodiments, the radiator 120 or a boundary of the radiator 120 may include a plurality of convex portions 122 and concave portions 124. As illustrated in FIG. 2, each of the convex portions 122 and the concave portions 124 may have a curved shape.

In exemplary embodiments, the convex portions 122 and the concave portions 124 may be alternately and repeatedly arranged along a profile of the radiator 120 in a plan view. For example, four convex portions 122 and four concave portions 124 may be alternately and repeatedly arranged along the profile of the radiator 120.

As illustrated in FIG. 2, the radiator 120 may have a curved cross shape. For example, the radiator 120 may have a substantially four-leaf clover shape.

In exemplary embodiments, a plurality of the transmission lines 130 and 135 may be connected to one radiator 120. For example, a first transmission line 130 and a second transmission line 135 may be connected to the radiator 120.

In exemplary embodiments, the transmission lines 130 and 135 may include the same conductive material as that of the radiator 120. In an embodiment, the transmission lines 130 and 135 may serve as a substantially unitary integral member connected with the radiator 120. In an embodiment, the transmission lines 130 and 135 may be formed individually from the radiator 120.

The first transmission line 130 and the second transmission line 135 may be arranged symmetrically with each other. For example, the first transmission line 130 and the second transmission line 135 may be disposed to be symmetrical to each other based on a central line of the radiator 120 in the y-direction.

Each of the transmission lines may include a feeding portion and a bent portion. The first transmission line 130 may include a first feeding portion 132 and a first bent portion 134, and the second transmission line 135 may include a second feeding portion 131 and a second bent portion 133.

Figure 10:
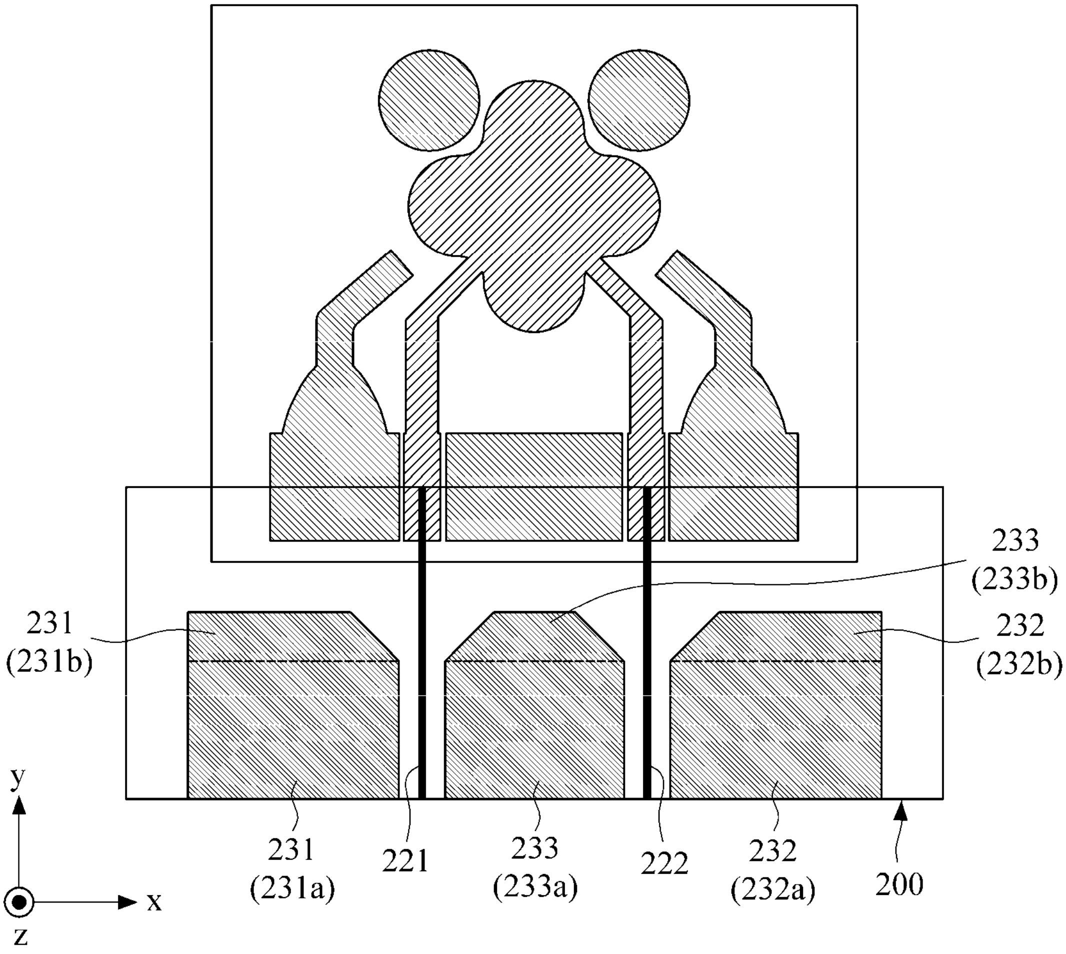

Each of the first feeding portion 132 and the second feeding portion 131 may be electrically connected to a feeding line included in a circuit board such as, e.g., a flexible printed circuit board (FPCB) (see FIG. 10). In some embodiments, the first feeding portion 132 and the second feeding portion 131 may extend in the y-direction. The first feeding portion 132 and the second feeding portion 131 may be substantially parallel to each other.

The first bent portion 134 and the second bent portion 133 may be bent from the first feeding portion 132 and the second feeding portion 131, respectively, and may extend in directions toward the radiator 120 to be directly connected to or in a direct contact with the radiator 120.

The first bent portion 134 and the second bent portion 133 may extend in different directions from each other to be connected to the radiator 120. In exemplary embodiments, an angle between extending directions of the first bent portion 134 and the second bent portion 133 may be substantially about 90°.

For example, the first bent portion 134 may be inclined by 45° in a clockwise direction with respect to the y-direction. The second bent portion 133 may be inclined by 45° in a counterclockwise direction with respect to the y-direction.

According to the structure and arrangement of the bent portions 133 and 134 as described above, feeding may be performed in substantially two orthogonal directions to the radiator 120 through the first transmission line 130 and the second transmission line 135. Accordingly, a dual polarization property may be implemented from one radiator 120. For example, vertical radiation and horizontal radiation properties may be implemented together from the radiator 120.

In some embodiments, the bent portions 133 and 134 may be connected to the concave portions 124 of the radiator 120. As illustrated in FIG. 2, the first bent portion 134 and the second bent portion 133 may be connected to different concave portions 124.

In an embodiment, the first bent portion 134 and the second bent portion 133 may be connected to lower concave portions 124 of four concave portions with respect to a central line extending in the x-direction of the radiator 122 in a plan view. The term "lower" herein may refer to a portion or a region adjacent to the feeding portions 131 and 132 with respect to the central line extending in the x-direction of the radiator 122.

In exemplary embodiments, the antenna device **100*a* may include the parasitic elements 140, 141, 142, 150 and 155 physically and electrically separated from the radiator 120 and the transmission lines 130 and 135**.

The parasitic elements may include lower parasitic elements 140, 141 and 142 adjacent to the transmission lines 130 and 135 and upper parasitic elements 150 and 155 adjacent to the radiator 120.

The lower parasitic elements 140, 141 and 142 may be located below the central line extending in the x-direction of the radiator 122 to be disposed around the transmission lines 130 and 135. The lower parasitic elements 140, 141 and 142 may include a central parasitic element 140, a first side parasitic element 142 and a second side parasitic element 141. In an embodiment, the central parasitic element 140 may be omitted.

The central parasitic element 140 may be interposed between the first transmission line 130 and the second transmission line 135. In an embodiment, the central parasitic element 140 may be interposed between the first feeding portion 132 and the second feeding portion 131.

The first side parasitic element 142 and the second side parasitic element 141 may be adjacent to both lateral sides of the central parasitic element 140. The first side parasitic element 142 may include a first parasitic body 144, a first parasitic extension 146 and a first parasitic bent portion 148. The second side parasitic element 141 may include a second parasitic body 143, a second parasitic extension 145 and a second parasitic bent portion 147.

The first parasitic body 144 may face the central parasitic element 140 with the first transmission line 130 interposed therebetween. The second parasitic body 143 may face the central parasitic element 140 with the second transmission line 135 interposed therebetween.

The first parasitic extension 146 and the second parasitic extension 145 may protrude and extend from the first parasitic body 144 and the second parasitic body 143, respectively. The first parasitic extension 146 and the second parasitic extension 145 may extend in the y-direction.

The first parasitic bent portion 148 and the second parasitic bent portion 147 may extend from end portions of the first parasitic extension 146 and the second parasitic extension 145, respectively, toward the radiator 120. In an embodiment, the first parasitic bent portion 148 and the second parasitic bent portion 147 may be substantially parallel to the first bent portion 134 and the second bent portion 133, respectively.

The upper parasitic elements 150 and 155 may be disposed at an upper region based on the central line of the radiator 120 in the x-direction. The term "upper" may refer to a portion or a region that is away from the feeding portions 131 and 132 or opposite to the feeding portions 131 and 132 with respect to the central line extending in the x-direction of the radiator 120 in the plan view.

The upper parasitic elements 150 and 155 may be adjacent to the radiator 120. In exemplary embodiments, the upper parasitic elements 150 and 155 may be adjacent to the concave portions 124 included in an upper portion of the radiator 120. For example, the upper parasitic elements 150 and 155 may be partially disposed in recesses formed by the concave portions 124.

The upper parasitic elements 150 and 155 may include a first upper parasitic element 150 and a second upper parasitic element 155. The first upper parasitic element 150 and the second upper parasitic element 155 may be disposed to be adjacent to different concave portions 124 of the radiator 120.

In exemplary embodiments, the first upper parasitic element 150 and the second upper parasitic element 155 may be disposed to face each other with the convex portion 122 included in the upper portion of the radiator 120 interposed therebetween.

In an embodiment, the first upper parasitic element 150 and the second upper parasitic element 155 may have a substantially circular shape. However, the first upper parasitic element 150 and the second upper parasitic element 155 may be modified into a proper shape (e.g., an elliptical shape or a polygonal shape) according to the shape of the radiator 120.

In exemplary embodiments, the radiator 120, the transmission lines 130 and 135, and the parasitic elements 140, 141, 142, 150 and 155 may all be disposed at the same level or at the same layer on the top surface of the dielectric layer 105. For example, the radiator 120, the transmission lines 130 and 135, and the parasitic elements 140, 141, 142, 150 and 155 may all be formed by patterning the same conductive layer.

According to the above-described exemplary embodiments, the radiator 120 may be formed to include the convex portion 122 and the concave portion 124, and the first and second transmission lines 130 and 135 may be connected to different concave portions 124 of the radiator 120 in intersecting directions. The dual polarization property may be implemented from the radiator 120 by the above-described dual transmission line structure.

In an embodiment, feeding signals having different phases may be applied to the first and second transmission lines 130 and 135. For example, a first feeding signal and a second feeding signal having a phase difference from about 120° to 200°, preferably from 120° to 180°, more preferably about 180° may be applied to the first and second transmission lines 130 and 135, respectively.

The antenna device 100*a* may be provided as a broadband antenna operable in a multi-resonance frequency band by the combination of the phase difference signaling, the dual transmission line structure and the shape of the radiator 120.

The parasitic elements 140, 141, 142, 150 and 155 may be provided in a floating pattern separated from other conductors, and may be adjacent to the radiator 120 to enhance a band formation of each resonance frequency in the multi-resonance frequencies implemented by the antenna device 100*a*.

Different resonance frequency bands may be distinguished by the above-described parasitic elements 140, 141, 142, 150 and 155, so that the antenna device 100*a* may be provided as a substantially multi-band antenna. Further, the lower parasitic elements 140, 141 and 142 may be disposed around the transmission lines 130 and 135, and the upper parasitic elements 150 and 155 may be adjacent to the upper portion of the radiator 120, so that signal enhancement and multi-band formation may be uniformly implemented in low-frequency and high-frequency bands, and an antenna gain may be improved.

In an embodiment, the antenna device 100*a* may serve as a triple band antenna. For example, three resonance frequency peaks in a range from 10 GHz to 40 GHz or from 20 GHz to 40 GHz may be provided from the antenna device 100*a*.

In an embodiment, a first resonance frequency peak in a range of 20 GHz to 25 GHz, a second resonance frequency peak in a range of 27 GHz to 35 GHz, and a third resonance frequency peak in a range of 35 GHz to 40 GHz may be implemented from the antenna device 100.

Figure 3:
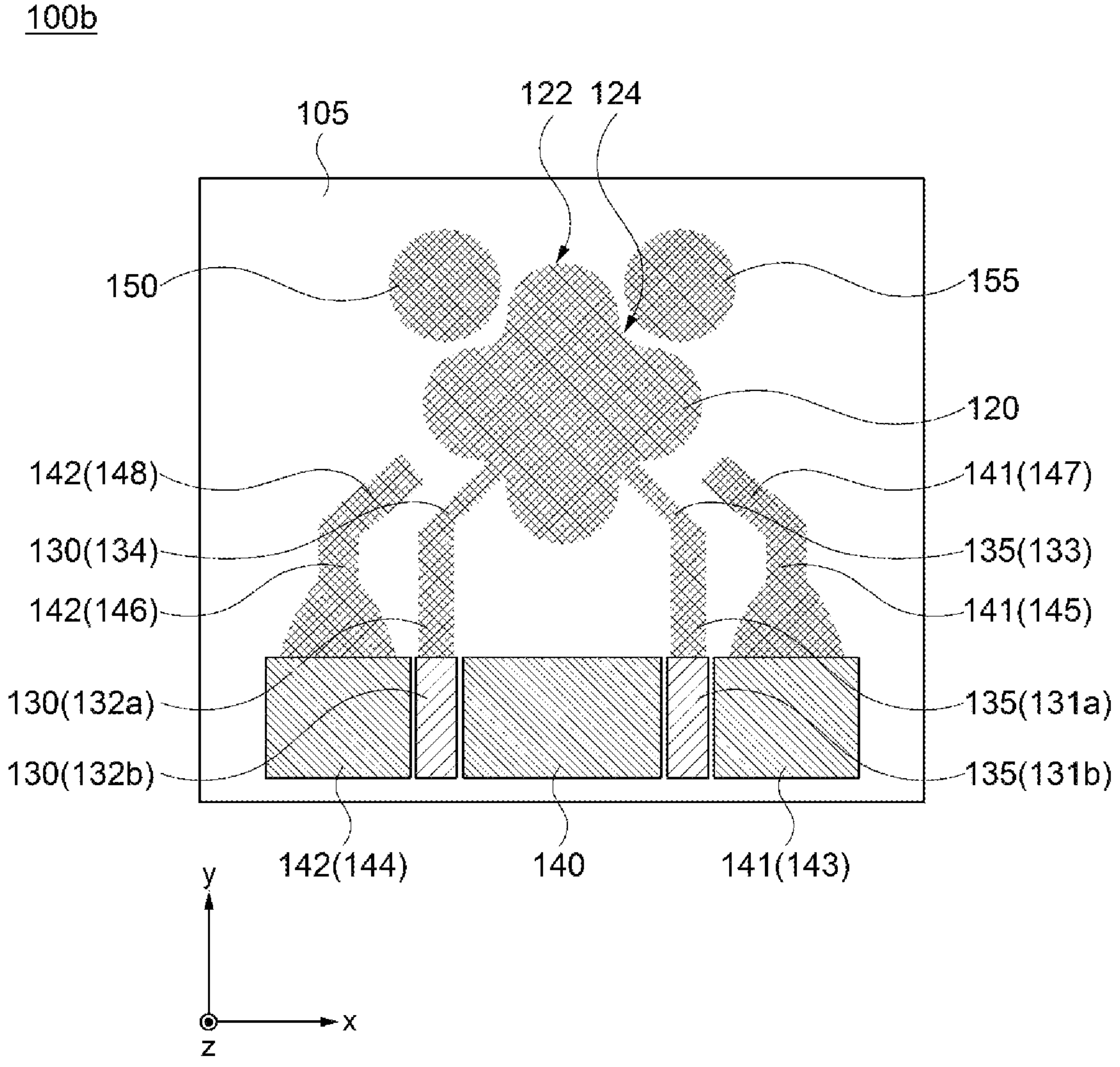
FIGS. 3 and 4 are schematic plan views illustrating antenna devices in accordance with exemplary embodiments.
Figure 4:
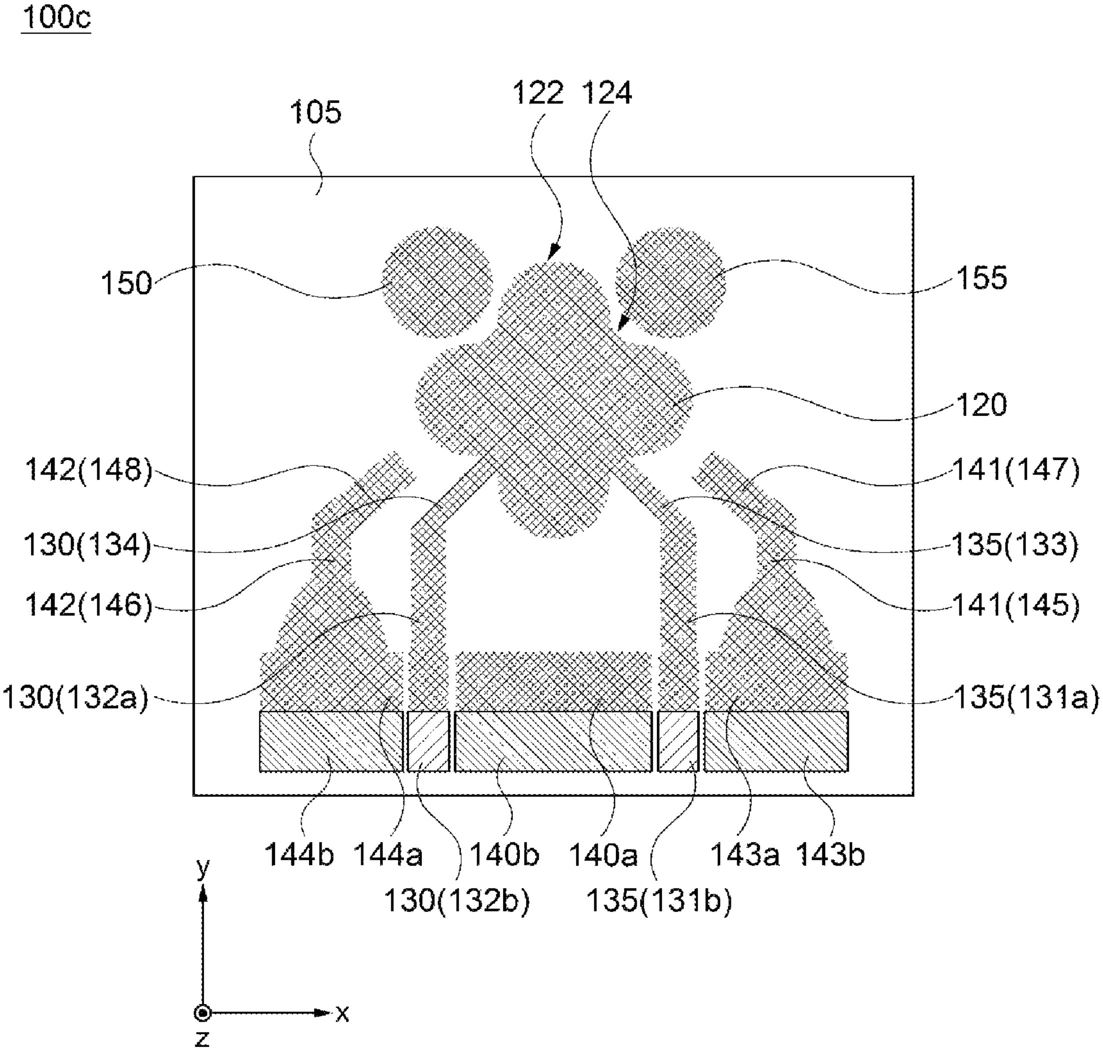

FIGS. 3 and 4 are schematic plan views illustrating antenna devices in accordance with exemplary embodiments. The antenna structures 100*b* and 100*c* of FIGS. 3 and 4 may be exemplary implementations of the antenna device 100 of FIG. 1. Detailed descriptions on elements and structures substantially the same as or similar to those described with reference to FIGS. 1 and 2 are be omitted herein.

Referring to FIG. 3, the antenna conductive layer 110 may include a mesh structure. In exemplary embodiments, the radiator 120 and the upper parasitic elements 150 and 155 may entirely include a mesh structure, and the transmission lines 130 and 135 and the lower parasitic elements 140, 141 and 142 may partially include a mesh structure.

For example, the central parasitic element 140 and the parasitic bodies 143 and 144 of the side parasitic elements 141 and 142 may include a solid structure. The feeding portions 131 and 132 of the transmission lines 130 and 135 may partially include a mesh structure.

In an embodiment, the first feeding portion 132 may include a first mesh portion 132*a* and a first solid portion 132*b*. The second feeding portion 131 may include a second mesh portion 131*a* and a second solid portion 131*b*.

The first solid portion 132*b* may be interposed between the central parasitic element 140 and the first parasitic body 144 having the solid structure. The second solid portion 131*b* may be interposed between the central parasitic element 140 and the second parasitic body 143 having the solid structure.

A remaining portion of the side parasitic element 141 and 142 except for the parasitic body 143 and 144 may have the mesh structure, and a remaining portion of the transmission line 130 and 135 except for the solid portion 131*b* and 132*b* may have the mesh structure.

In an embodiment, portions of the antenna conductive layer 110 having the mesh structure may be disposed in a display area of an image display device. Accordingly, transmittance through the antenna conductive layer 110 may be improved to prevent degradation of an image quality of the image display device.

In an embodiment, a dummy mesh pattern (not illustrated) may be formed around portions of the antenna conductive layer 110 disposed in the display area. In this case, a pattern structure may become uniform to prevent the antenna conductive layer 110 from being visually recognized by a user.

In an embodiment, portions of the antenna conductive layer 110 having the solid structure may be disposed in a light-shielding area or a bezel area of the image display device. Accordingly, feeding efficiency may be improved by using a low-resistance solid metal layer and formation of the multiple-band may be promoted from the lower parasitic elements 140, 141 and 142.

Referring to FIG. 4, the central parasitic element 140 and the parasitic bodies 143 and 144 may also partially include the mesh structure.

The central parasitic element 140 may include a mesh element portion 140*a* and a solid element portion 140*b*. The first parasitic body 144 may include a first mesh body 144*a* and a first solid body 144*b*. The second parasitic body 143 may include a second mesh body 143*a* and a second solid body 143*b*.

A length of a mesh portion may also be extended in the feeding portions 131 and 132 of the transmission lines 130 and 135. For example, a first mesh portion 132*a* may be disposed between the first mesh body 144*a* and the mesh element portion 140*a*. A second mesh portion 131*a* may be disposed between the second mesh body 143*a* and the mesh element portion 140*a*.

For example, as the bezel area is reduced and the display area of the image display device is expanded, the central parasitic element 140 and the parasitic bodies 143 and 144 may also partially include the mesh structure to improve optical properties.

Figure 5:
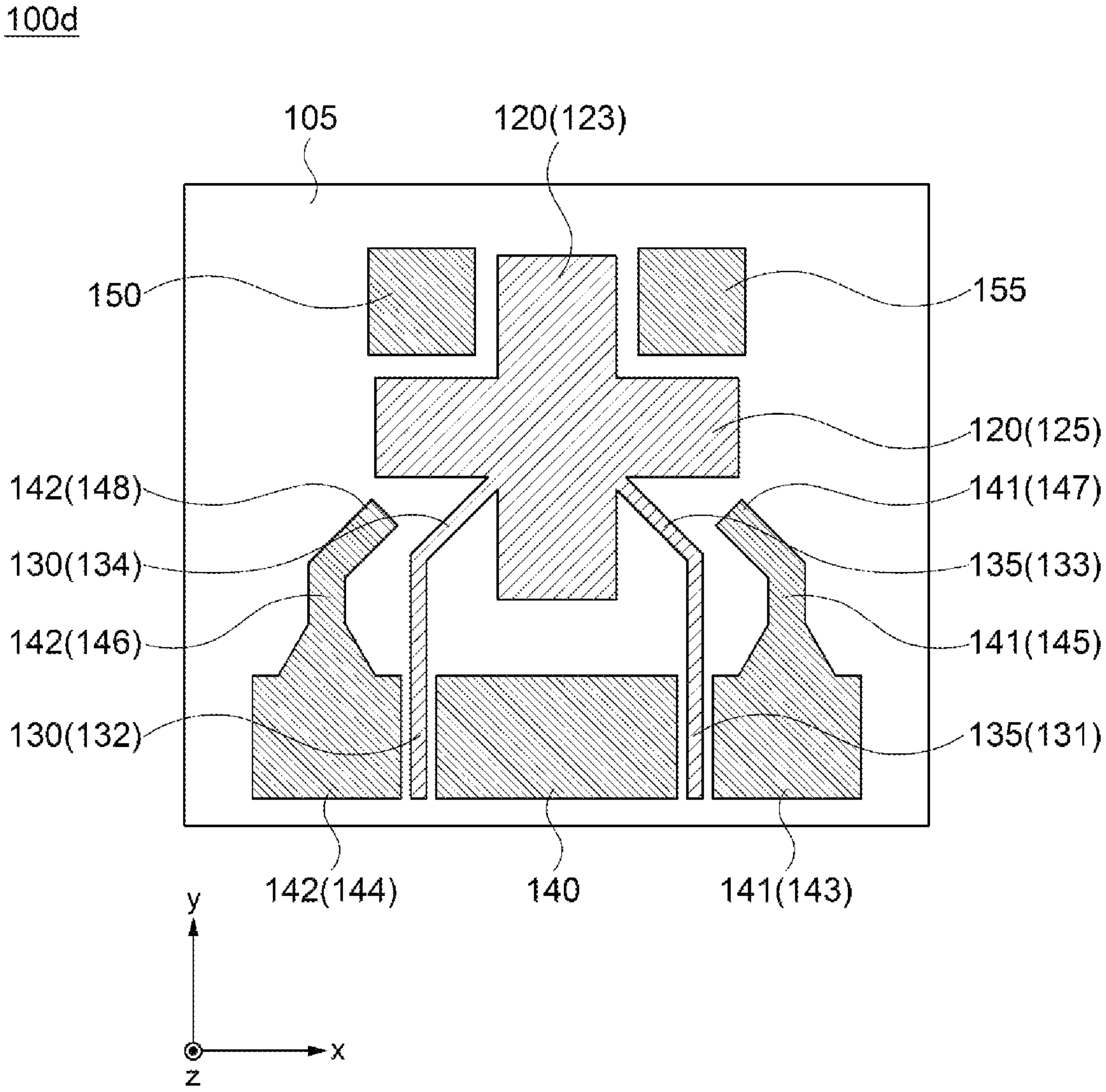
FIGS. 5 and 6 are schematic plan views illustrating antenna devices in accordance with exemplary embodiments.
Figure 6:
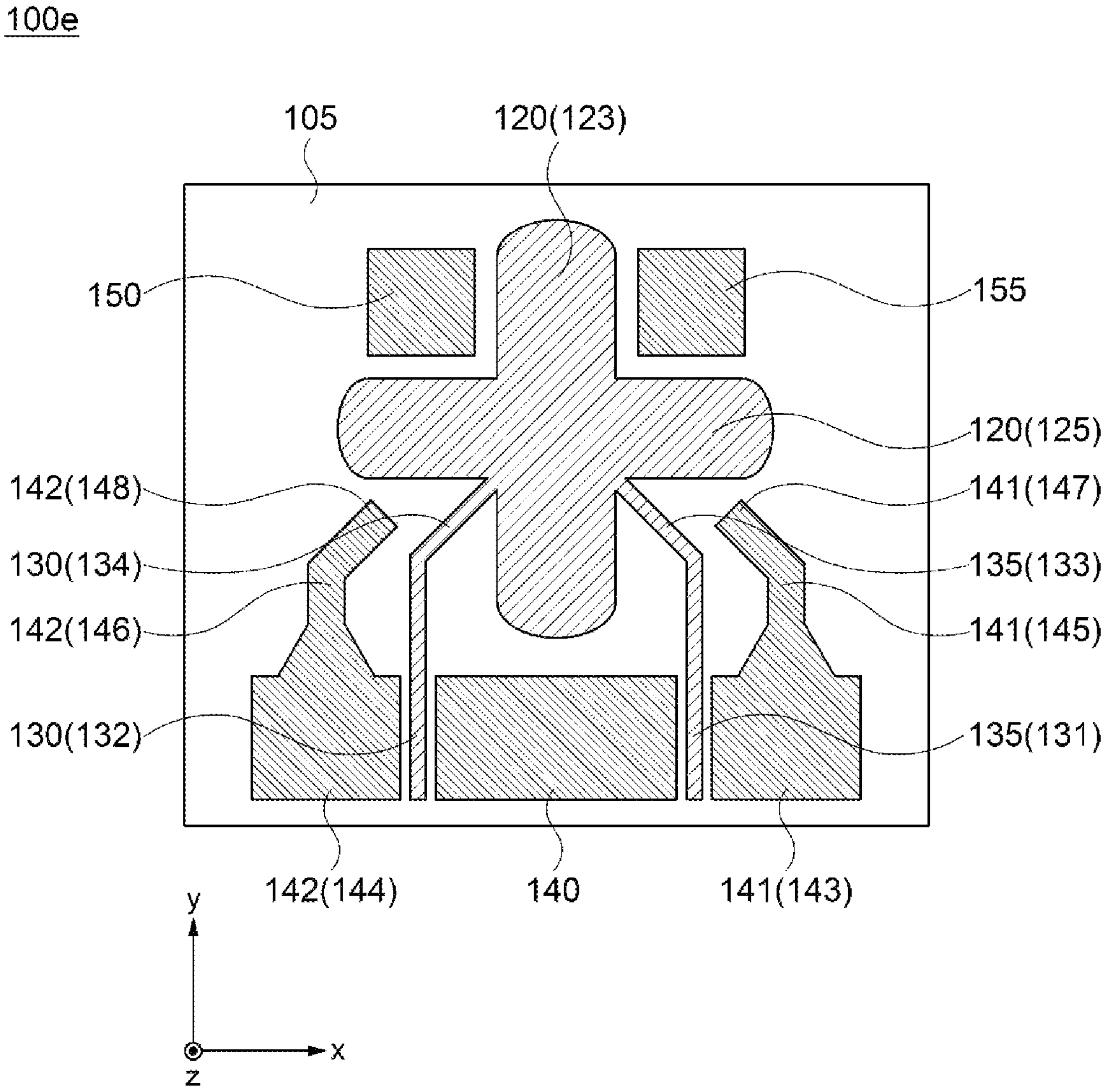

FIGS. 5 and 6 are schematic plan views illustrating antenna devices in accordance with exemplary embodiments. The antenna structures 100*d* and 100*e* of FIGS. 5 and 6 may be exemplary implementations of the antenna structure 100 of FIG. 1. Detailed descriptions on elements and structures substantially the same as or similar to those described with reference to FIGS. 1 and 2 are omitted herein.

Referring to FIG. 5, the radiator 120 may have a cross shape. For example, the radiator 120 may include a first radiation bar 123 and a second radiation bar 125 extending in directions perpendicular to each other and crossing each other. For example, the first radiation bar 123 may extend in the y-direction, and the second radiation bar 125 may extend in the x-direction.

Protrusions may be defined by the radiation bars 123 and 125, and a concave portion may be defined by a space between the radiation bars 123 and 125. The upper parasitic elements 150 and 155 may be disposed to be adjacent to the concave portions included in the upper portion of the radiator 120.

Referring to FIG. 6, end portions of the first radiation bar 123 and the second radiation bar 125 may each have a curved shape.

As described above, the shape of the radiator 120 may be properly modified in consideration of radiation efficiency and multi-band generation efficiency, and may not be limited as that in illustrated in FIGS. 2 to 6.

Figure 7:
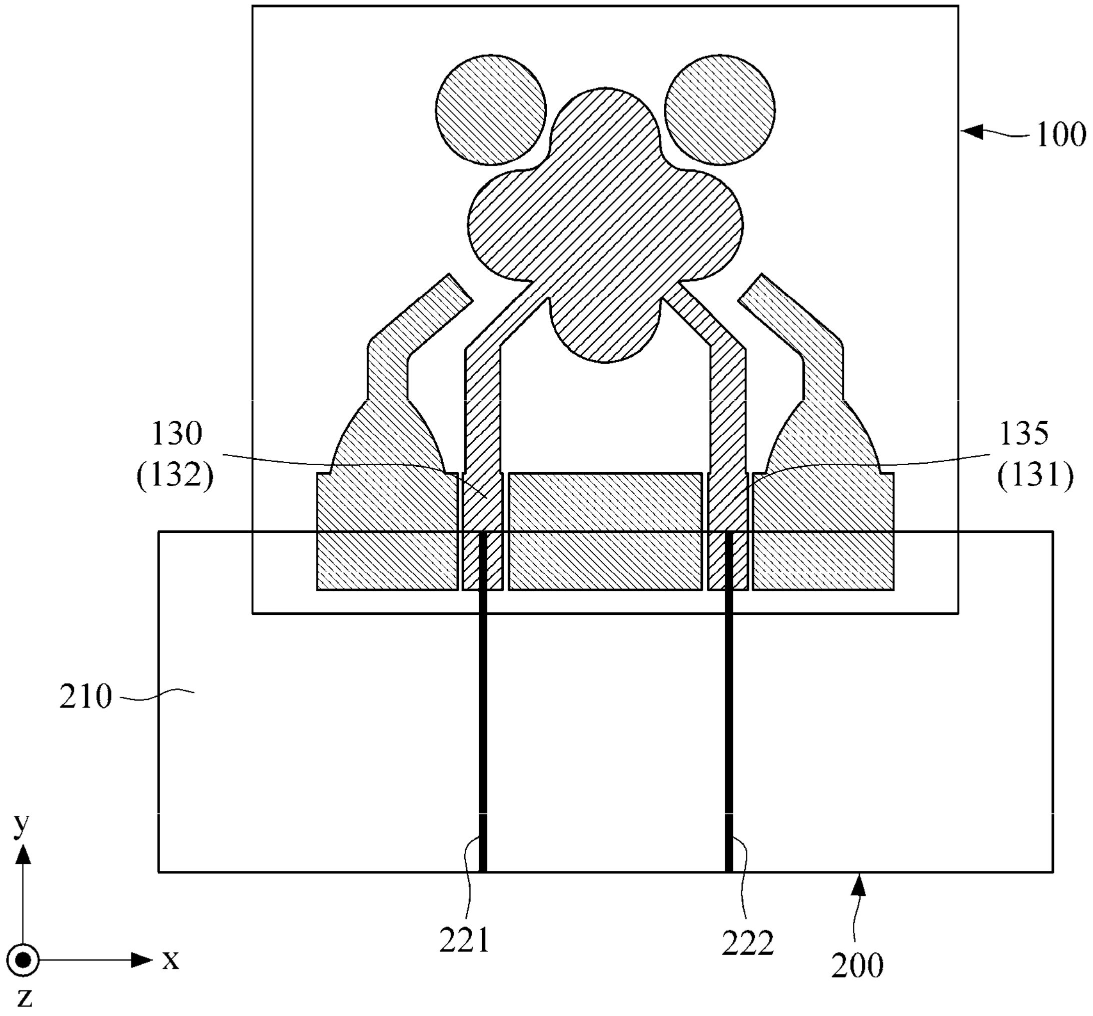
FIG. 7 is a schematic plan view illustrating an antenna package in accordance with exemplary embodiments.
Figure 8:
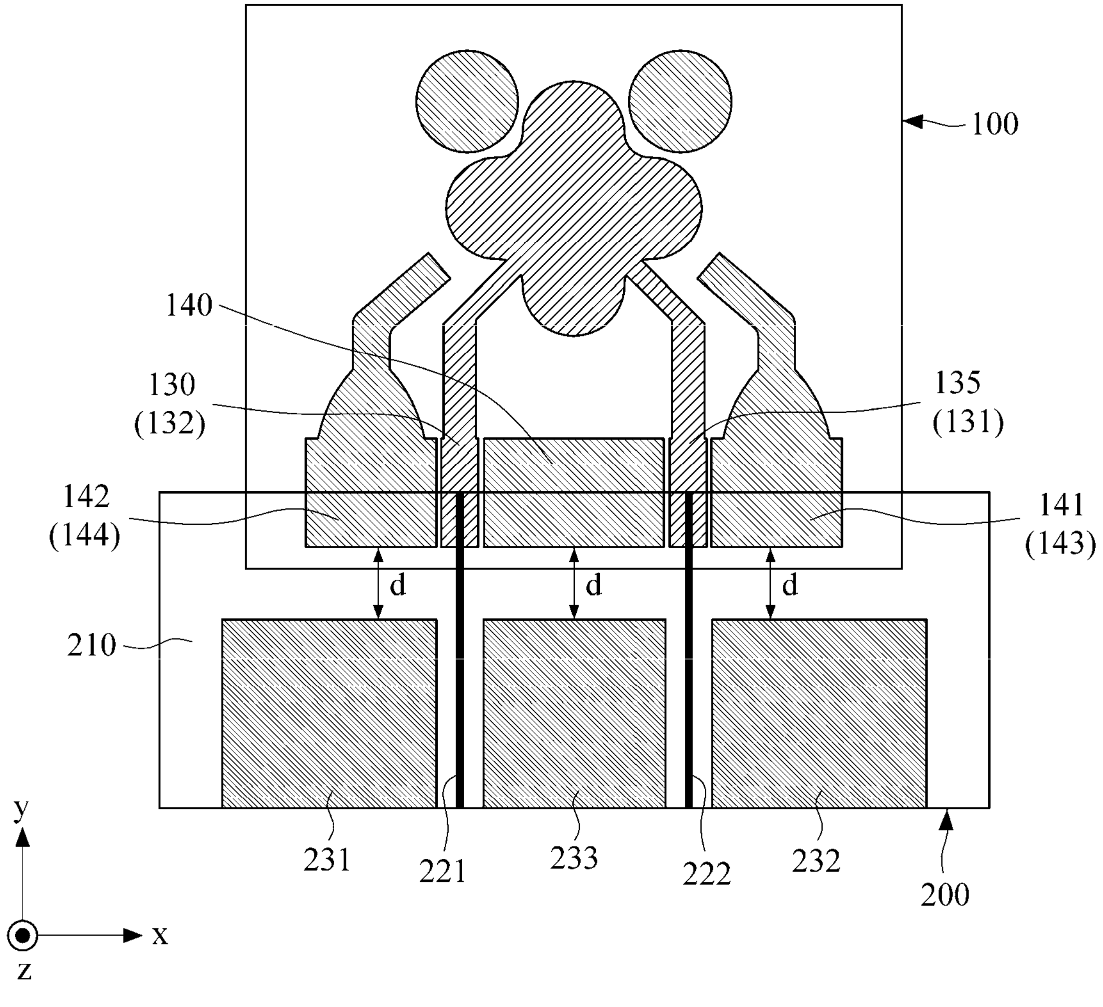
FIGS. 8 to 11 are schematic plan views illustrating antenna packages in accordance with exemplary embodiments.

FIGS. 7 and 8 are schematic plan views illustrating antenna structures in accordance with exemplary embodiments. The antenna structure of FIGS. 7 and 8 may be exemplary implementations of the antenna structure 100 of FIG. 1.

FIG. 7 is a schematic plan view illustrating an antenna package in accordance with exemplary embodiments. Detailed descriptions of elements and structures substantially the same as or similar to those described with reference to FIGS. 1 to 6 will be omitted.

Referring to FIG. 7, an antenna package according to exemplary embodiments may include the antenna device 100 and a circuit board 200.

The circuit board 200 may be a flexible printed circuit board (FPCB). The circuit board 200 may include a core layer 210 including a flexible resin and feeding lines 221 and 222 formed on the core layer 210.

In exemplary embodiments, the core layer 210 may include a liquid crystal polymer layer. The core layer 210 may further include a low-k adhesive layer having a dissipation factor (DO similar to or lower than that of the liquid crystal polymer layer. The low-k adhesive layer may include at least one of an epoxy-based monomer, an olefin, and a modified polyimide-based resin.

The feeding lines 220 may include silver (Ag), gold (Au), copper (Cu), aluminum (Al), platinum (Pt), palladium (Pd), chromium (Cr), titanium (Ti), tungsten (W)), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy containing at least one of the metals. These may be used alone or in combination thereof. Preferably, the feeding lines 221 and 222 may include copper (Cu) or a copper alloy.

The feeding lines 221 and 222 may include a first feeding line 221 and a second feeding line 222. Each of the first feeding line 221 and the second feeding line 222 may be attached to the first feeding portion 132 and the second feeding portion 131 through a conductive intermediate structure such as an anisotropic conductive film (ACF). Accordingly, the first feeding line 221 may be electrically connected to the first feeding portion 132, and the second feeding line 222 may be electrically connected to the second feeding portion 131.

Terminal ends of the first feeding portion 132 and the second feeding portion 131 bonded to the feeding lines 220 may serve as a first antenna port and a second antenna port, respectively. A feeding signal may be applied from an antenna driving IC chip 340 (see FIG. 14) through the first antenna port and the second antenna port.

As described above, the feeding signal having a phase difference (e.g., 120°-180° phase difference) may be applied to the radiator 120 through the first antenna port and the second antenna port to implement the multi-band antenna.

FIGS. 8 to 11 are schematic plan views illustrating antenna packages in accordance with exemplary embodiments. Detailed descriptions of elements or structures substantially the same as or similar to those described with reference to FIGS. 1 to 7 will be omitted.

Referring to FIGS. 8 to 11, the circuit board 200 may further include CPW (Co-Planar waveguide) grounds 231, 232 and 233 formed on the core layer 210.

The CPW grounds 231, 232 and 233 may be physically separated from the feeding lines 221 and 222 and the lower parasitic elements 140, 141 and 142, and may be disposed around the feeding lines 221 and 222 and the lower parasitic elements 140, 141 and 142. The CPW grounds 231, 232 and 233 may include a central ground 233, a first side ground 231 and a second side ground 232.

The central ground 233 may be disposed between the first feeding line 221 and the second feeding line 222.

The first side ground 231 and the second side ground 232 may be adjacent to both lateral portions of the central ground 233. For example, the first side ground 231 may face the central ground 233 with the first feeding line 221 interposed therebetween. The second side ground 232 may face the central ground 233 with the second feeding line 222 interposed therebetween.

In exemplary embodiments, a spacing distance d in a plan view between the CPW grounds 231, 232 and 233 and the lower parasitic elements 140, 141 and 142 may be at least 20

μm or more to prevent a coupling between the CPW grounds 231, 232 and 233 and the lower parasitic elements 140, 141 and 142.

For example, as illustrated in FIG. 8, a spacing distance between the CPW grounds 231, 232 and 233 and the feeding lines 221 and 222 may be substantially constant along the y-direction.

Figure 9:
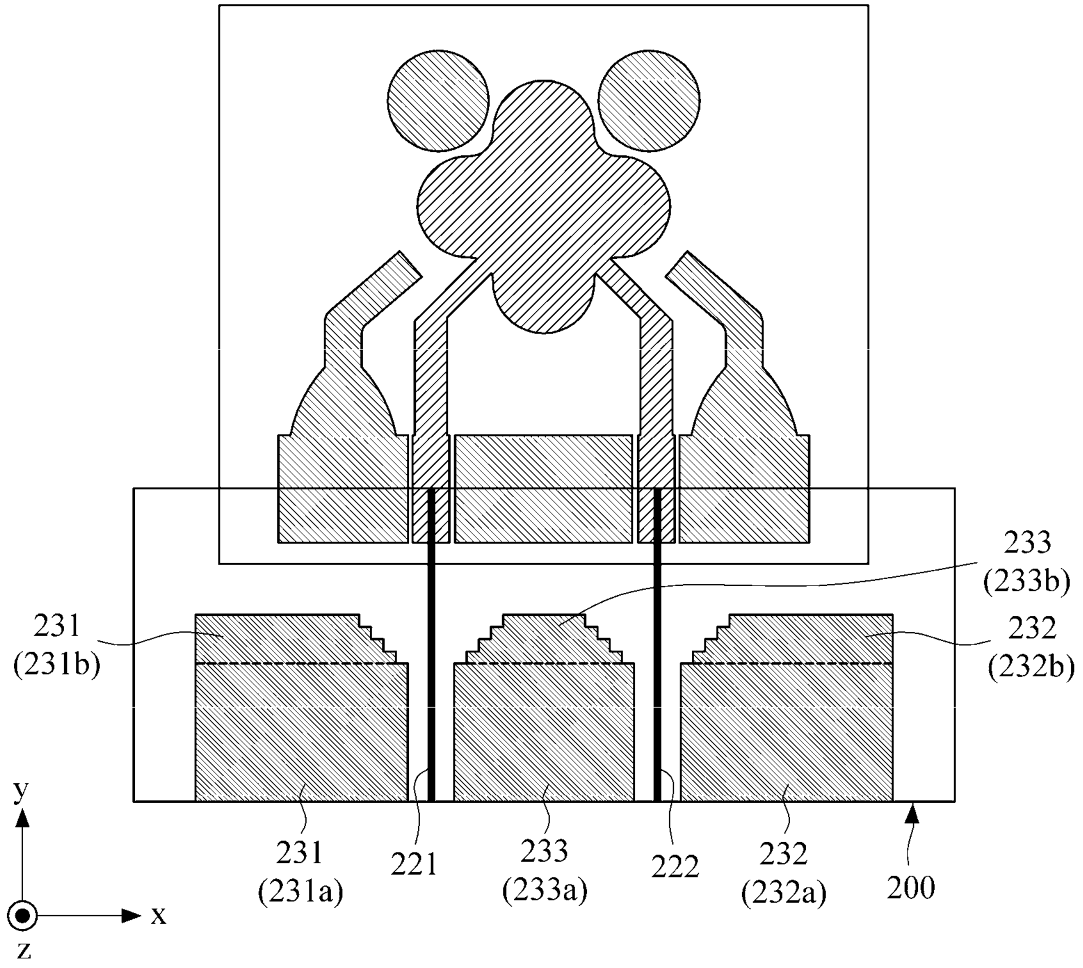
Figure 11:
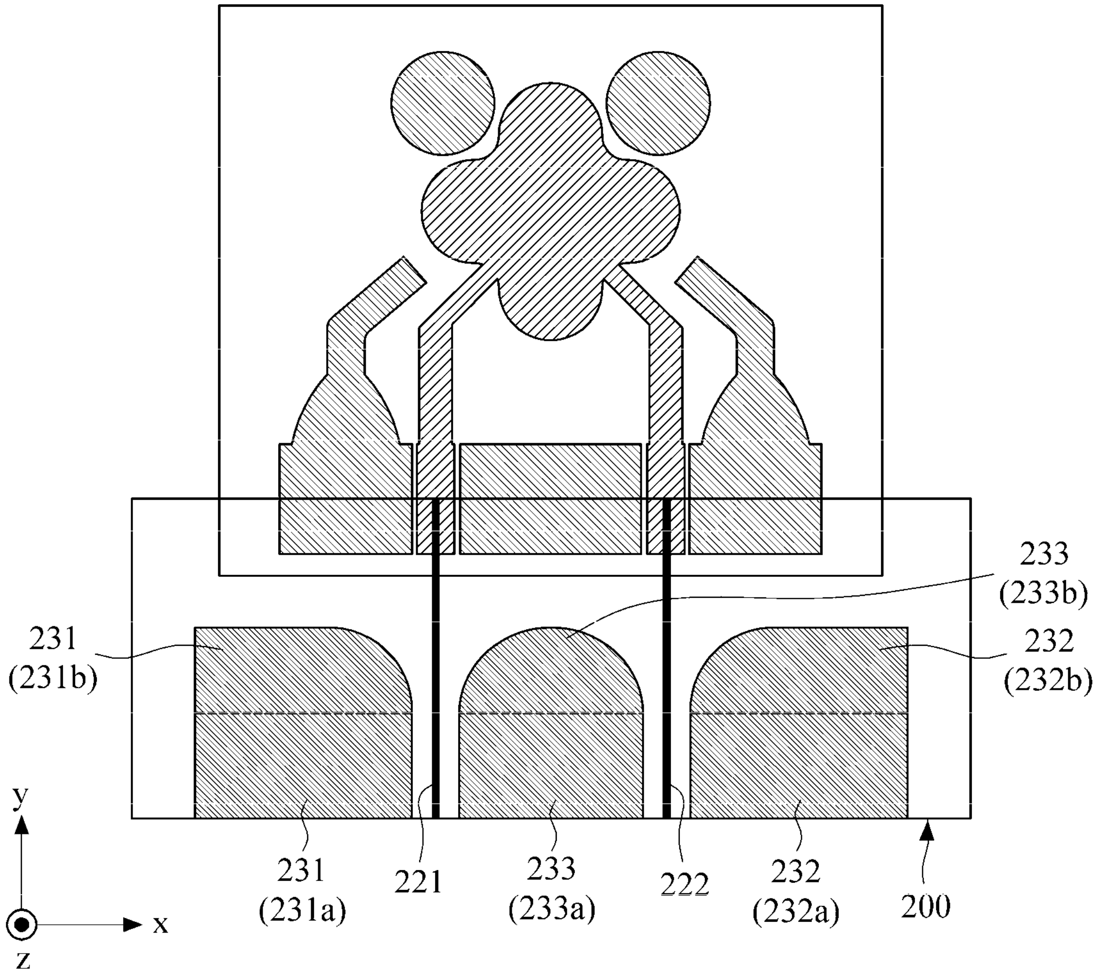

In some embodiments, as illustrated in FIGS. 9 to 11, at least a portion of the CPW grounds 231, 232 and 233 may be formed to be farther away from the feeding lines 221 and 222 along the y-direction toward the antenna device 100.

For example, the CPW grounds 231, 232 and 233 may include the first regions 231*a*, 232*a* and 233*a* having the same spacing distance from the feeding lines 221 and 222, and second regions 231*b*, 232*b* and 233*b* that may become farther from the feeding lines 221 and 222 along the y-direction toward the antenna device 100.

For example, the second regions 231*b*, 232*b* and 233*b* may become farther away from the feeding lines 221 and 222 in a stepwise type (see FIG. 9), a chamfer type (see FIG. 10) or a round type (see FIG. 11).

A signal loss due to an impedance mismatch in a high frequency or ultra-high frequency band may be reduced using the construction of the above-described CPW grounds 231, 232 and 233.

A coplanar waveguide (CPW) or a grounded coplanar waveguide (GCPW) structure may be formed by disposing the CPW grounds 231, 232 and 233 around the feeding lines 221 and 222. Accordingly, a degree of isolation between the feeding lines 221 and 222 may be improved.

Figure 12:
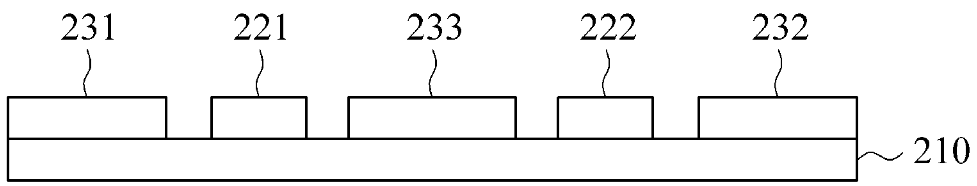
FIG. 12 is a schematic cross-sectional view illustrating a circuit board of a CPW structure in accordance with exemplary embodiments.
Figure 13:
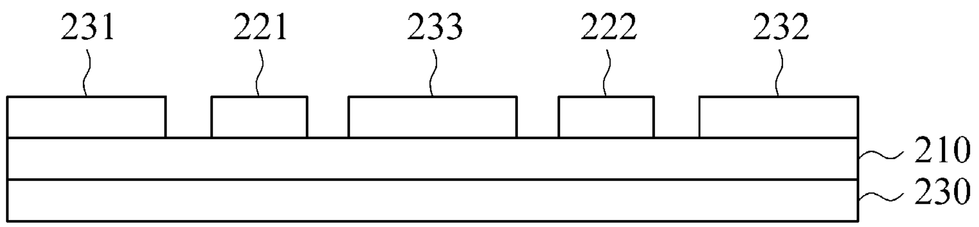
FIG. 13 is a schematic cross-sectional view illustrating a circuit board of a GCPW structure in accordance with exemplary embodiments.

FIG. 12 is a schematic cross-sectional view illustrating a circuit board of a CPW structure in accordance with exemplary embodiments. FIG. 13 is a schematic cross-sectional view illustrating a circuit board of a GCPW structure in accordance with exemplary embodiments.

As illustrated in FIG. 12, in the circuit board of the CPW structure, the CPW grounds 231, 232 and 233 and the feeding lines 221 and 222 may be disposed on a top surface of the core layer 210. As illustrated in FIG. 13, in the circuit board of the GCPW structure, a ground 230 may be added to the CPW structure on a bottom surface of the core layer 210. In some embodiments, the CPW grounds 231, 232 and 233 disposed on the top surface of the core layer 210 may be electrically connected to the ground 230 through vias disposed on the bottom surface of the core layer 210.

Figure 14:
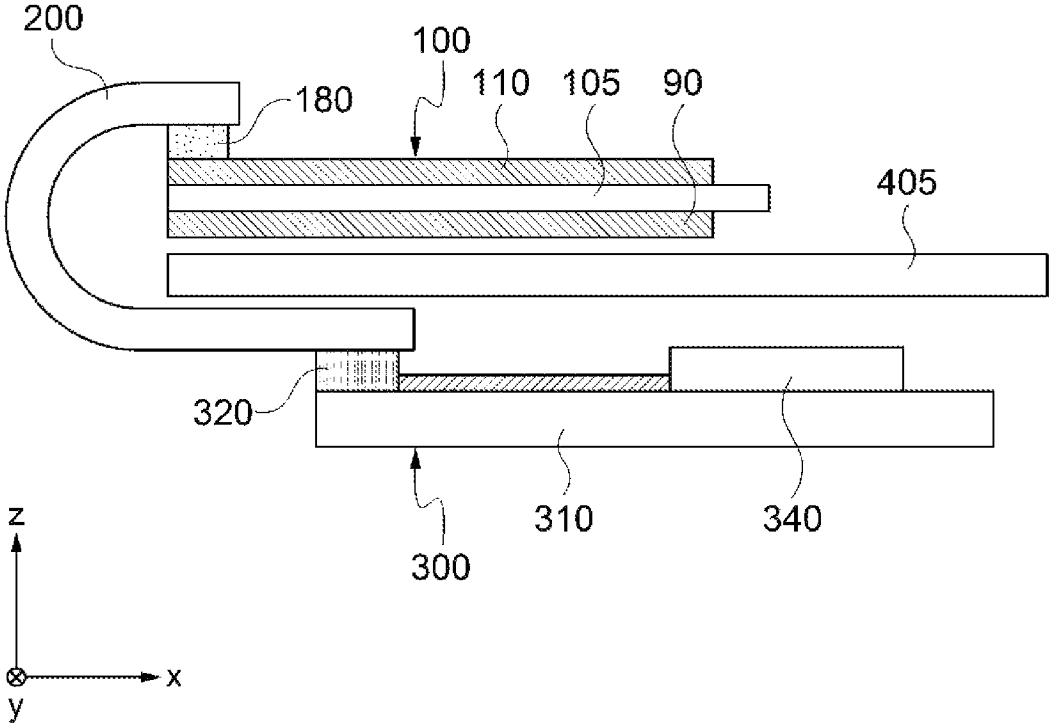
FIG. 14 is a schematic cross-sectional view illustrating an image display device in accordance with exemplary embodiments.
Figure 15:
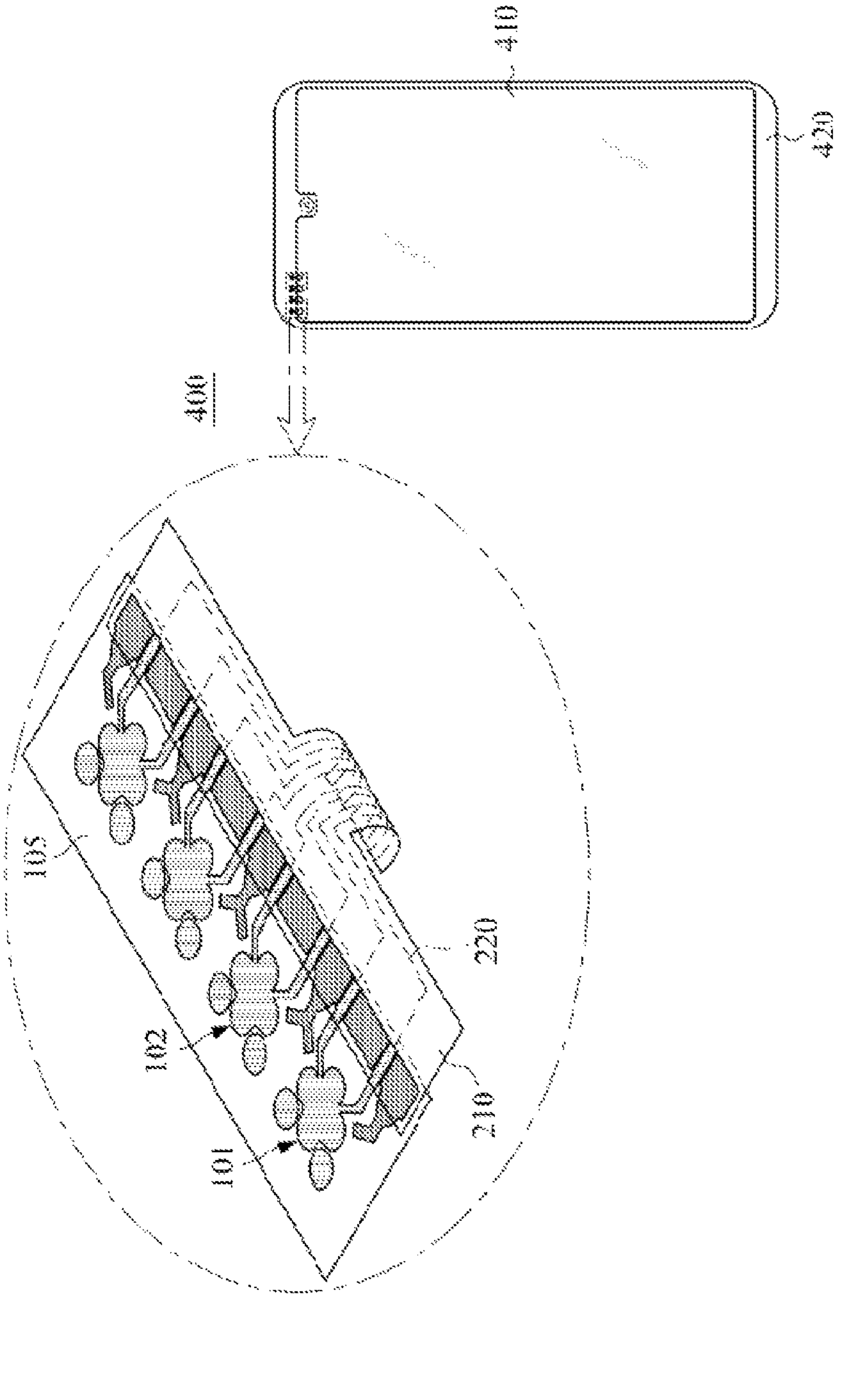
FIG. 15 is a schematic plan view illustrating an image display device in accordance with exemplary embodiments.

FIG. 14 is a schematic cross-sectional view illustrating an image display device in accordance with exemplary embodiments. FIG. 15 is a schematic plan view illustrating an image display device in accordance with exemplary embodiments.

Referring to FIGS. 14 and 15, an image display device 400 may be fabricated in the form of, e.g., a smart phone, and FIG. 15 illustrates a front portion or a window surface of the image display device 400. The front portion of the image display device 400 may include a display area 410 and a peripheral area 420. The peripheral area 420 may correspond to, e.g., a light-shielding portion or a bezel portion of the image display device.

The antenna device 100 included in the antenna package may be disposed toward the front portion of the image display device 400. For example, the antenna device 100 may be disposed on a display panel 405. The radiator 120 may be disposed on the display area 410 in a plan view.

In this case, the radiator 120 may include the mesh structure, and a reduction of transmittance due to the radiator 120 may be prevented. The lower parasitic elements 140, 141 and 142 and the feeding portions 131 and 132 included in the antenna device 100 may include a solid metal pattern, and may be disposed on the peripheral region 420 to prevent a degradation of an image quality.

In exemplary embodiments, the circuit board 200 may be bent to be disposed at a rear portion of the image display device 400 and extend toward a chip mounting board 300 on which an antenna driving IC chip 340 is mounted.

The circuit board 200 and the chip mounting board 300 may be coupled to each other by a connector 320 to be included in the antenna package. The connector 320 and the antenna driving IC chip 340 may be electrically connected via a connection circuit 310.

For example, the chip mounting board 300 may be a rigid printed circuit board (Rigid PCB).

As illustrated in FIG. 15, the antenna device 100 may include a plurality of antenna units 101 and 102 including the above-described radiator, transmission line and parasitic elements. The antenna units 101 and 102 neighboring each other may share the side parasitic element. For convenience of illustration, illustration of the CPW grounds is omitted in FIG. 15. A feeding line 220 of FIG. 15 may include the first and second feeding lines 221 and 222.

What is claimed is:

1. An antenna package, comprising:

an antenna device comprising:

a dielectric layer;

a radiator disposed on a top upper surface of the dielectric layer;

a transmission line comprising a first transmission line and a second transmission line that extend in different directions on the top upper surface of the dielectric layer to be connected to the radiator and a lower parasitic element disposed to be adjacent to the transmission line and a lower portion of the radiator on the top upper surface of the dielectric layer and a circuit board bonded to the antenna device, the circuit board comprising:

a core layer;

a feeding line formed on the core layer and bonded to the antenna device; and a CPW (Co-planar waveguide) ground formed on the core layer to be physically separated from the feeding line, the antenna device and the lower parasitic element.

2. The antenna package of claim 1, wherein a spacing distance between the CPW ground and the feeding line is constant.

3. The antenna package of claim 1, wherein at least a portion of the CPW ground is farther away from the feeding line as the CPW ground becomes closer to the antenna device.

4. The antenna package of claim 3, wherein the CPW ground comprises:

a first region having a constant spacing distance from the feeding line; and a second region that is farther away from the feeding line as the CPW ground becomes closer to the antenna device.

5. The antenna package of claim 4, wherein the second region has a stepped shape or a chamfer shape.

6. The antenna package of claim 1, wherein the antenna device further comprises: an upper parasitic element disposed to be adjacent to an upper portion of the radiator on the top surface of the dielectric layer.

7. The antenna package of claim 6, wherein the feeding line comprises:

a first feeding line bonded to the first transmission line; and a second feeding line bonded to the second transmission line, wherein the CPW ground comprises:

a central ground disposed between the first feeding line and the second feeding line;

a first side ground facing the central ground with the first feeding line interposed therebetween; and a second side ground facing the central ground with the second feeding line interposed therebetween.

8. The antenna package of claim 6, wherein the CPW ground is disposed around the lower parasitic element.

9. The antenna package of claim 8, wherein a spacing distance between the CPW ground and the lower parasitic element in a plan view is 20 μm or more.

10. The antenna package of claim 6, wherein the radiator comprises convex portions and concave portions, and the first transmission line and the second transmission line are connected to different concave portions of the concave portions.

11. The antenna package of claim 6, wherein the first transmission line comprises:

a first feeding portion; and a first bent portion extending from the first feeding portion to be connected to the radiator;

wherein the second transmission line comprises:

a second feeding portion; and a second bent portion extending from the second feeding portion to be connected to the radiator.

12. The antenna package of claim 6, wherein the upper parasitic element comprises a first upper parasitic element and a second upper parasitic element separated from each other.

13. The antenna package of claim 12, wherein the radiator comprises convex portions and concave portions, and the first upper parasitic element and the second upper parasitic element are adjacent to different concave portions of the concave portions.

14. The antenna package of claim 13, wherein the first upper parasitic element and the second upper parasitic element face each other with a convex portion located at an upper portion of the radiator among the convex portions interposed therebetween.

15. The antenna package of claim 6, wherein the lower parasitic element comprises:

a central parasitic element disposed between the first transmission line and the second transmission line;

a first side parasitic element facing the central parasitic element with the first transmission line interposed therebetween; and a second side parasitic element facing the central parasitic element with a second transmission line interposed therebetween.

16. The antenna package of claim 15, wherein the first side parasitic element comprises:

a first parasitic body facing the central parasitic element with the first transmission line interposed therebetween;

a first parasitic extension protruding from the first parasitic body; and a first parasitic bent portion extending from the first parasitic extension toward the radiator, wherein the second side parasitic element comprises:

a second parasitic body facing the central parasitic element with the second transmission line interposed therebetween;

a second parasitic extension protruding from the second parasitic body; and a second parasitic bent portion extending from the second parasitic extension toward the radiator.

17. The antenna package of claim 16, wherein the radiator has a mesh structure, and the central parasitic element, the first parasitic body and the second parasitic body have a solid structure.

18. The antenna package of claim 17, wherein a portion of the first transmission line between the central parasitic element and the first parasitic body has a solid structure, and a remaining portion of the first transmission line has a mesh structure, and a portion of the second transmission line between the central parasitic element and the second parasitic body has a solid structure, and a remaining portion of the second transmission line has a mesh structure.

19. The antenna package of claim 16, wherein the radiator has a mesh structure, and each of the central parasitic element, the first parasitic body and the second parasitic body comprises a mesh portion and a solid portion.

20. An image display device comprising the antenna package of claim 1.

* * * * *